(12) United States Patent
Stettes et al.

(10) Patent No.: US 6,401,597 B1
(45) Date of Patent: Jun. 11, 2002

(54) COFFEE VENDING MACHINE FILTER PAPER SUPPORT

(75) Inventors: Gregory Glen Stettes, Pacific; Franklin Dale Newkirk, Florissant; Charles James Pomeroy, St. Louis, all of MO (US)

(73) Assignee: Crane Co., Stamford, CT (US)

( * ) Notice: Subject to any disclaimer, the term of this patent is extended or adjusted under 35 U.S.C. 154(b) by 0 days.

(21) Appl. No.: 09/654,849

(22) Filed: Sep. 5, 2000

(51) Int. Cl.$^7$ ................................................ A47J 31/00

(52) U.S. Cl. ................ 99/289 T; 99/279; 242/423; 242/596.3; 242/598.4

(58) Field of Search ........................... 99/289 T, 289 R, 99/279; 242/423, 596.3, 598.1, 598.4

(56) References Cited

U.S. PATENT DOCUMENTS

| | | | | |
|---|---|---|---|---|
| 564,688 A | * | 7/1896 | Hicks | ........................ 242/423 |
| 978,535 A | | 12/1910 | Armstrong | |
| 1,136,700 A | * | 4/1915 | Moore | ..................... 242/598.1 |
| 1,545,634 A | | 7/1925 | Bird | |
| 1,625,472 A | | 4/1927 | Kelly | |

(List continued on next page.)

FOREIGN PATENT DOCUMENTS

JP 62-211800 9/1987

OTHER PUBLICATIONS

Xpresso, Inc., *Impressa X70*, 1998, pp. 1–2.
Stentorfield, *Contour*, 4/98, pp. 1–6.
Stentorfield, *Profile*, 4/98, pp. 1–6.
Automatic Marketing Industries, Inc., *Coffee–Inn's ® The Mocha Mart (Model MM–2C)*, undated, pp. 1.
Cafection inc. Enterprises, *Discover the Timeless Coffee Perfection of Avalon*, undated, pp. 1–5.
Coffee Fresh Sverig AB, *coffee fresh* www.coffeefresh.com, undated, pp. 1–4.
Crane National Vendors, *Café System 7 Hot Beverage Table–Top Dispenser*, undated, pp. 1–2.
Douwe Egberts, *Gallery 200. De stijlvolle automaat voor altijd verse koffie in vele variaties.*, undated, pp. 1–2.
Filterfresh, *Filterfresh is always ready to serve you the perfect cup of coffee!*, undated, pp. 1–2.
Rhea Vendors S.p.A., *P.C.M The racing car for coffee*, undated, pp. 1–4.
Spengler Getränkemaschinen GmbH, to FB 11 and in 11 *The New Generation of Tabletop Dispensers*, undated, pp. 1–2.
Spengler Getränkemaschinen GmbH, top FB 11 and in 11 *Das Einzigartige Geschmackserlebnis*, undated, pp. 1–2.
Spengler Getränkemaschinen GmbH, *Office Line*, (English version), undated, pp. 1–2.
Spengler Getränkemaschinen GmbH, *Office Line*, (German version) undated, pp. 1–2.
The Sankey Unicafé, *A New Dimension In Fresh Brewed Coffee*, undated, pp. 1–2.
Van Nelle, *Gallery 300 Vers, Gevarieerd, Volautomatisch.*, undated, pp. 1–3.
Westomatic Vending Services Limited, *MONACO®*, undated, pp. 1–3.
Zanussi Vending, *Dispenser*, undated, pp. 1–2.
Filter Paper Roll Support Bracket, admitted prior art, undated, pp. 1–4.

Primary Examiner—Reginald L. Alexander
(74) *Attorney, Agent, or Firm*—Hughes & Luce, L.L.P.

(57) ABSTRACT

A filter paper roll support apparatus for a coffee vending machine, having a fixed arm and a pivotable arm spaced from the fixed arm for supporting opposite ends of a support roll on which the paper roll is mounted for rotation. The pivotable arm is hinged and spring biased towards the fixed arm. A spacing element is formed in each of the arms to engage the opposite sides of a roll of filter paper to keep it from rubbing on the main bodies of the arms.

5 Claims, 5 Drawing Sheets

U.S. PATENT DOCUMENTS

| | | | | |
|---|---|---|---|---|
| 2,427,611 A | | 9/1947 | Lane | 242/56 |
| 2,570,313 A | | 10/1951 | Bourgonjon et al. | |
| 3,008,659 A | * | 11/1961 | Plotkin et al. | 242/423 |
| 3,095,800 A | | 7/1963 | Gilbert | 99/289 T |
| 3,125,945 A | | 3/1964 | Hanson et al. | 99/289 T |
| 3,181,734 A | | 5/1965 | Ensign | 99/289 T |
| 3,213,777 A | | 10/1965 | Heier | 99/289 T |
| 3,465,632 A | | 9/1969 | Bilek | 83/555 |
| 3,585,289 A | | 6/1971 | Huber et al. | |
| 3,838,519 A | | 10/1974 | Chick | |
| 4,099,435 A | | 7/1978 | Young | 83/614 |
| 4,117,753 A | | 10/1978 | Friddle, Sr. et al. | 83/143 |
| 4,219,727 A | | 8/1980 | Bolt | 83/16 |
| 4,252,450 A | | 2/1981 | Goodman et al. | 400/208 |
| 4,358,979 A | | 11/1982 | Kurzbuch | 83/658 |
| 4,381,083 A | * | 4/1983 | Tsunetsugu | 242/598.1 |
| 4,383,458 A | | 5/1983 | Kitai et al. | 83/405 |
| 4,506,596 A | | 3/1985 | Shigenobu et al. | 99/289 T |
| 4,647,373 A | | 3/1987 | Tokar et al. | 210/232 |
| 4,694,739 A | | 9/1987 | Daintrey et al. | 99/289 R |
| 4,696,744 A | | 9/1987 | Sedlacek | 210/387 |
| 4,722,255 A | | 2/1988 | Choate et al. | 83/23 |
| 4,791,859 A | | 12/1988 | King | 99/289 R |
| 4,839,732 A | | 6/1989 | Murakami et al. | 358/304 |
| 4,907,014 A | | 3/1990 | Tzeng et al. | 346/24 |
| 4,984,511 A | | 1/1991 | Sekiguchi | 99/287 |
| 4,998,462 A | | 3/1991 | Sekiguchi | 99/289 T |
| 5,001,955 A | | 3/1991 | Fujiwara | 83/488 |
| 5,074,449 A | | 12/1991 | Slonneger | 225/91 |
| 5,127,317 A | | 7/1992 | Takayanagi et al. | 99/289 T |
| 5,235,887 A | | 8/1993 | Moriya | 83/282 |
| 5,265,518 A | | 11/1993 | Reese et al. | 99/280 |
| 5,299,491 A | | 4/1994 | Kawada | 99/289 T |
| 5,353,692 A | | 10/1994 | Reese et al. | 99/289 T |
| 5,515,772 A | | 5/1996 | De Groen | 99/289 T |
| 5,520,093 A | | 5/1996 | Ackermann | 99/289 T |
| 5,555,790 A | | 9/1996 | Ackermann | 99/289 T |
| 5,762,759 A | | 6/1998 | Wedel | 162/193 |

* cited by examiner

COFFEE VENDING MACHINE FILTER PAPER SUPPORT

BACKGROUND OF THE INVENTION

The present invention relates to coffee vending machines and, more particularly, to a support apparatus for a roll of filter paper used in the brewing process of such a machine. Coffee vending machines designed to brew a single cup of coffee at a time and dispense it into a cup at a cup station generally utilize a brewing system that has a split brewing chamber that is opened between brewing cycles to dispose of coffee grounds utilized to brew coffee in the preceding brewing cycle. Typically, a roll of filter paper is supported along one side of the brewing chamber and the paper is unwound from the role and drawn through the brewing chamber by a drive mechanism when the brewing chamber is opened. The used paper and coffee grounds supported by the paper is moved into a receptacle and a new clean section of filter paper unwound from the roll is moved into the brewing chamber which is then closed for a new brewing cycle.

Such coffee vending machines are regularly serviced by personnel who clean the machines, replace used ingredients and, when needed, replace the used roll of filter paper with a new roll. Ease of service is an important aspect with the design of any such coffee machine since the longer it takes to service the machine the more expensive it is to maintain. Particularly table top versions of such coffee vending machines are very compact internally and provide little space to maneuver within for servicing. In the past, the filter paper roll has been suspended from a pair of fixed arms with open slots in the top of the arms which support the roll by pins on a support roll extending through the roll of filter paper. To insert and remove the roll of paper and its support roll, it was necessary to lift the pins out of the slots and maneuver the roll through limited space in the machine. This has proven to be difficult and time consuming for service personnel.

SUMMARY OF THE INVENTION

The present invention overcomes the above described difficulties and disadvantages associated with prior art filter paper support apparatus in coffee vending machines by providing an apparatus that is more easily accessed and allows quick and easy withdraw and insertion of a paper roll in the machine. This is accomplished by providing a filter paper roll mounting apparatus for use in a coffee vending machine, comprising a mounting bracket; a first paper roll support arm rigidly fixed to and extending perpendicular from a first end of the mounting bracket and having an opening for receiving a first end of a support pin for a roll of paper; a second paper roll support arm hinged to and extending from a second end of the mounting bracket spaced from the fixed arm and having an opening for receiving a second end of the support pin for the roll of paper so that the roll of paper is supported for rotation between the fixed and hinged arms, the hinged arm being pivotable from a position for supporting the second end of the pin and a position which allows the pin and roll to be removed from or inserted into the apparatus. In its preferred form the apparatus utilizes a spring to urge the hinged arm toward the fixed arm to hold the roll of paper between them during use. Also, it preferably has a fastener engaging the first end of the paper roll support pin securing the support pin to the fixed support arm so as to prevent removal of the pin from the fixed support arm, and a spacing element on each of the fixed and hinged arms engageable with opposite sides of the roll of paper mounted between the arms to keep the roll of paper from engaging the remainder of the arms.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENT

Figure 1:
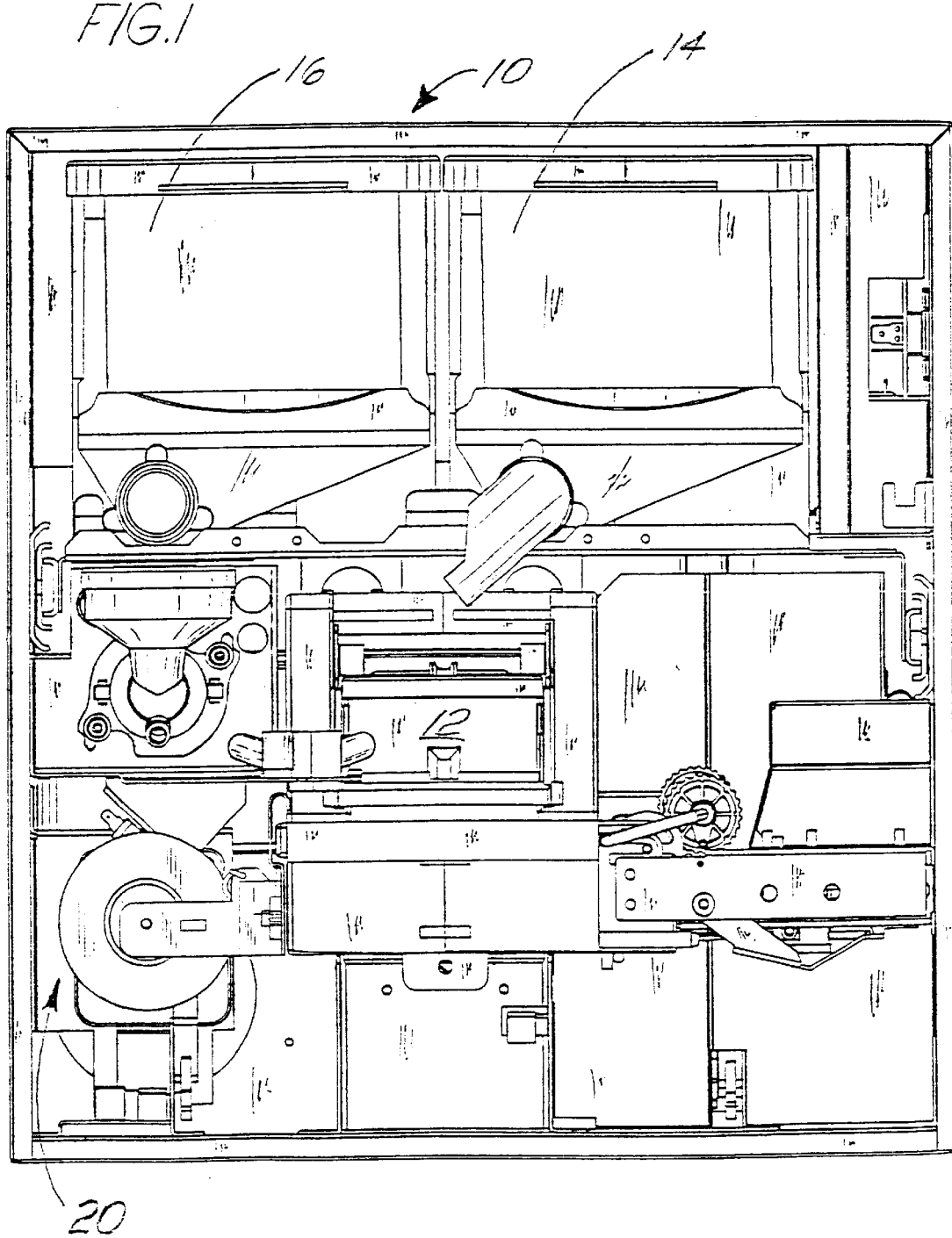
FIG. 1 is a front elevational view of a table top coffee vending machine with the front service door removed and with the preferred embodiment of the apparatus of the present invention mounted therein.
Figure 2:
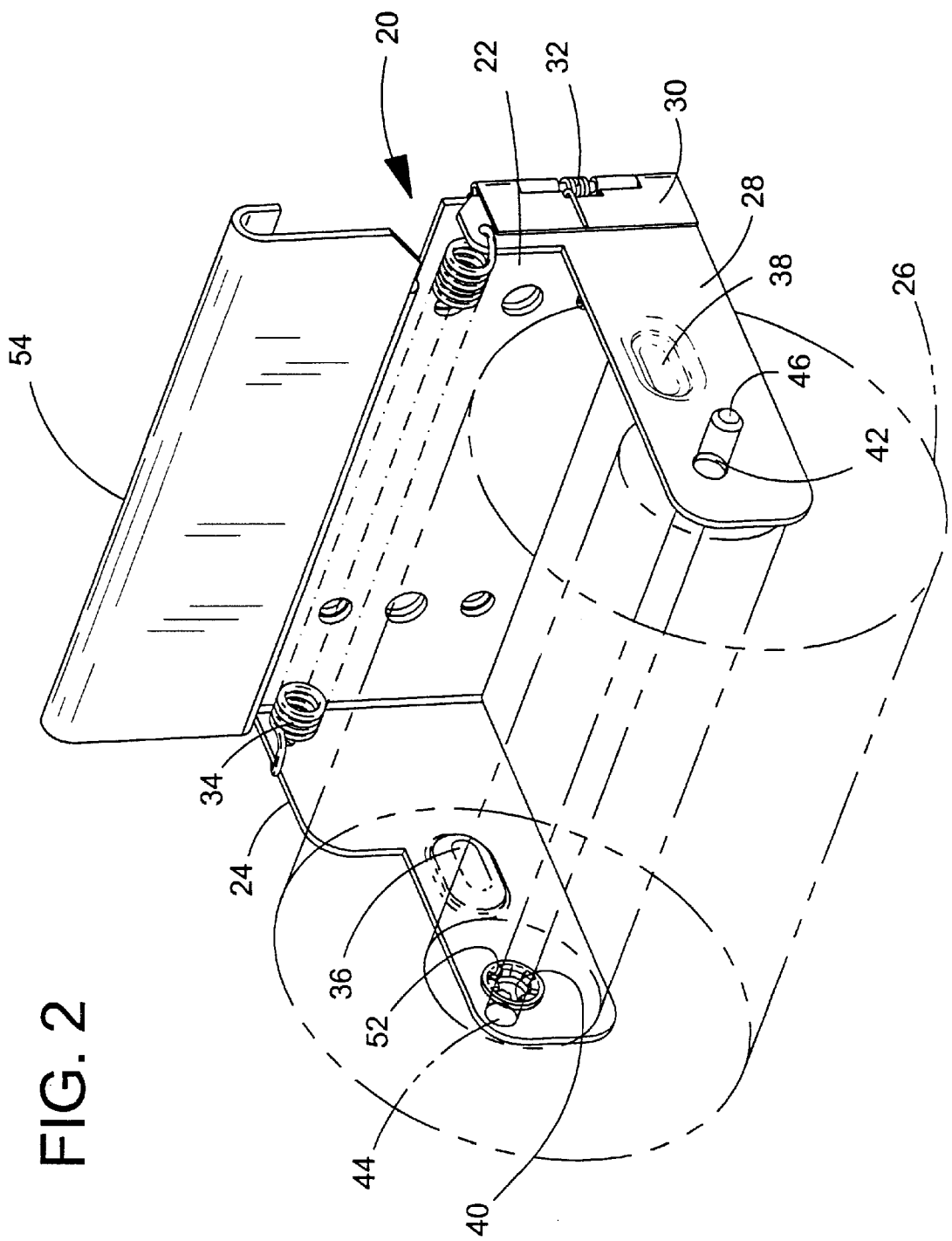
FIG. 2 is a pictorial view of the preferred form of the filter paper roll mounting apparatus of the present invention with a roll of paper and a support roll for the roll of paper shown in phantom.
Figure 3:
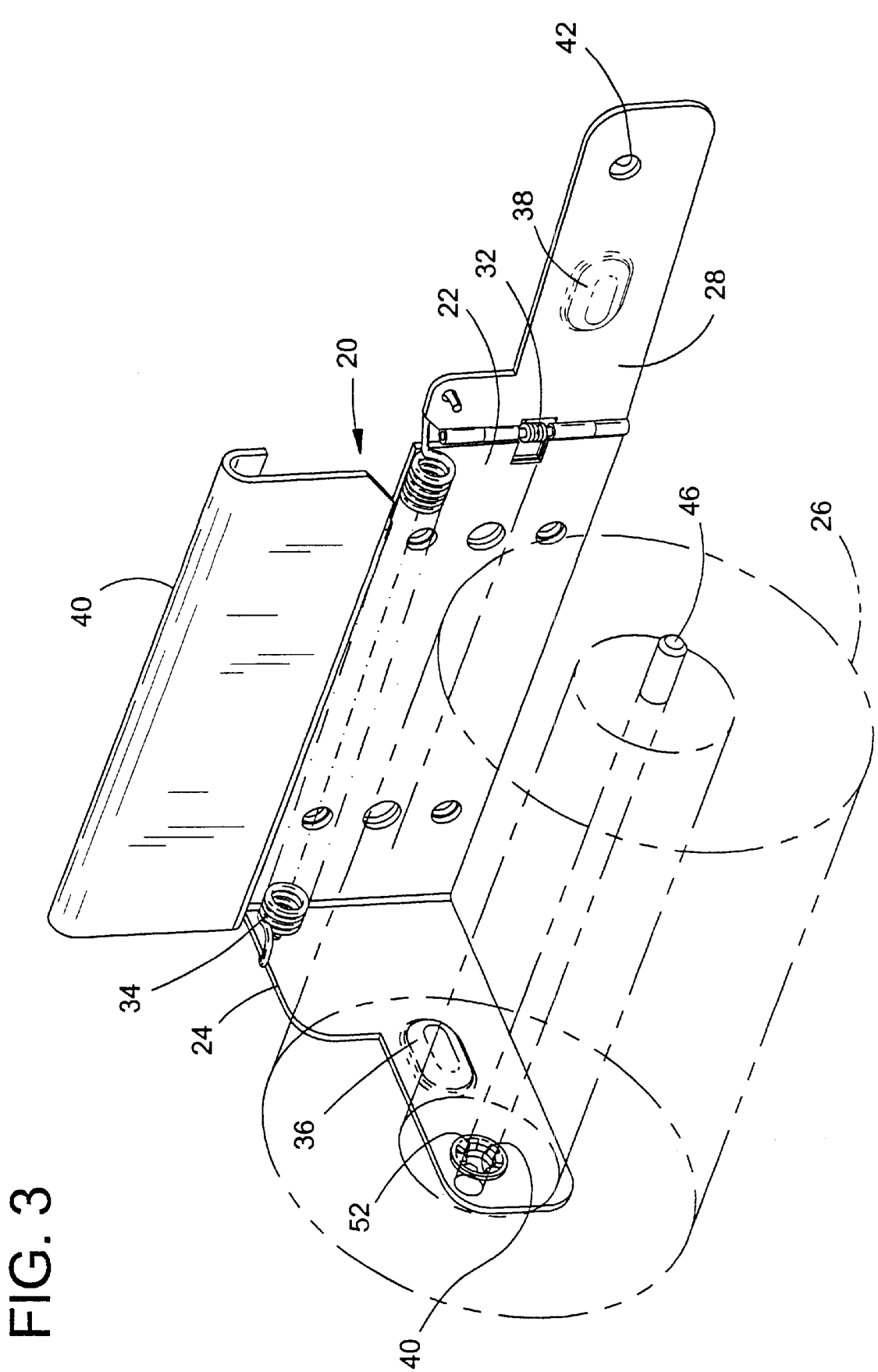
FIG. 3 is a view similar to FIG. 2 with the hinged arm shown rotated outwardly.

A table top coffee vending machine 10 is shown generally in FIG. 1 with its front service door removed to make the internal components visable. Such machines typically include a coffee brewing chamber 12 which is supplied with ground coffee from a storage canister 14 and a condiment storage container 16 typically containing creamer or sugar. The filter paper roll support apparatus 20 of the present invention is secured by bolts or the like to the frame of the machine 10 adjacent the brewing chamber 12. As seen in FIG. 2, the filter paper support apparatus 20 includes a mounting bracket 22 with which it is secured to the frame of the machine 10. Formed integral with or fixed to one end of bracket 22 is a fixed arm 24 for supporting one end of a roll of filter paper 26, shown in phantom. Pivotally mounted at an opposite end of bracket 22 is another arm 28 for supporting the other end of a roll of filter paper 26. Arm 28 is connected to mounting bracket 22 with a hinge 30 which has its hinge plates welded or other wise secured to the mounting bracket 22 and arm 28 so that the arm can be pivoted between the position shown in FIG. 2, for supporting the roll of filter paper 26, and the position shown in FIG. 3, where the filter paper can be removed from the support apparatus 20. In the preferred embodiment, a hinge spring 32 is used to urge or bias the arm 28 toward the fixed arm 24 to assist in keeping the arm 28 in position to support the paper roll 26 for use. Other means could be used in place of the hinge spring to hold the arm 28 in a position perpendicular to the mounting bracket during use and allow it to be moved out of the way for removal of paper roll 26. In addition, a supplemental tensioning spring 34 can be provided to assist in holding the hinged arm 28 in position to support the paper roll 26 during use.

Figure 4:
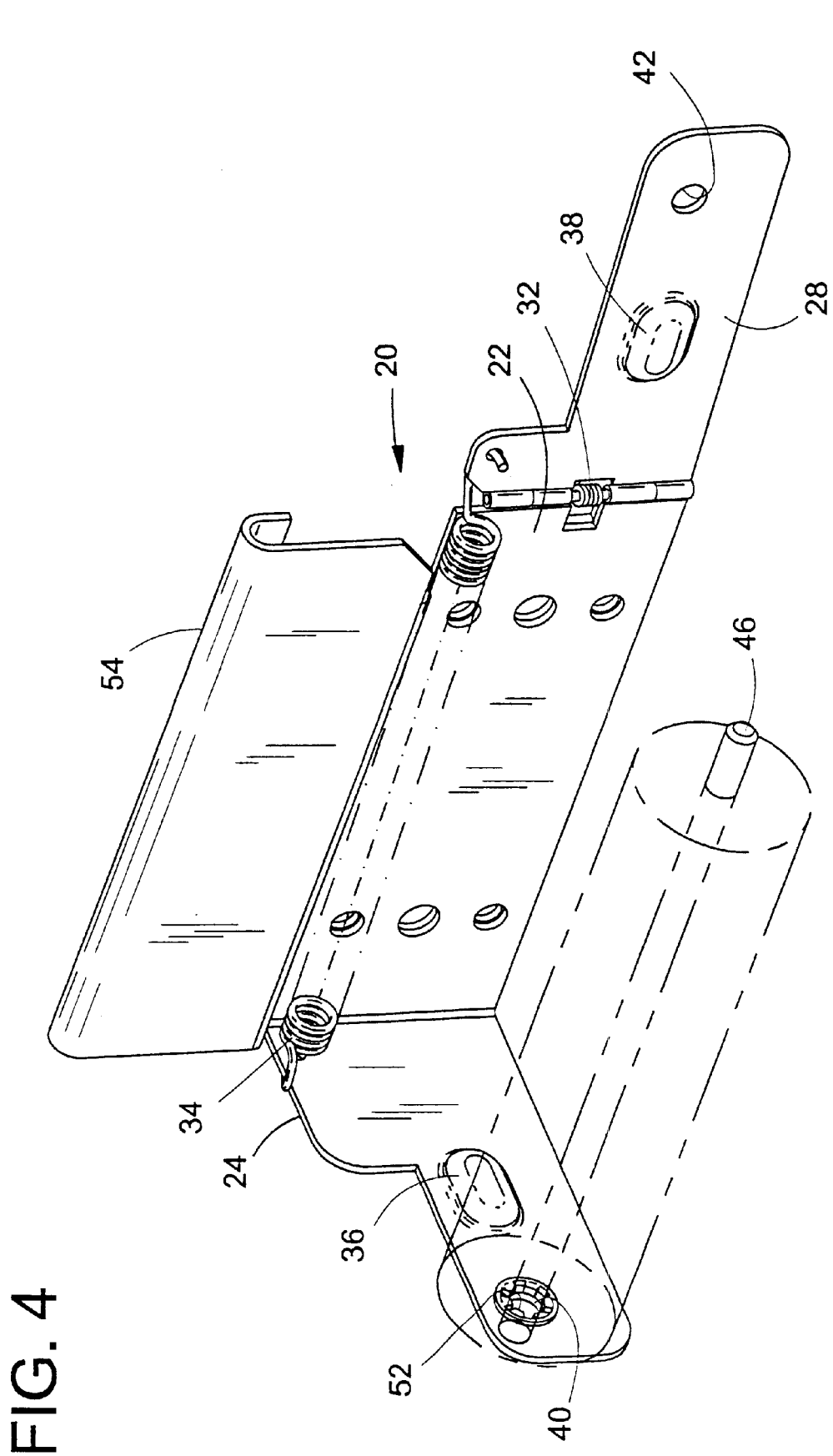
FIG. 4 is a view similar to FIG. 3 with the roll of filter paper removed.
Figure 5:
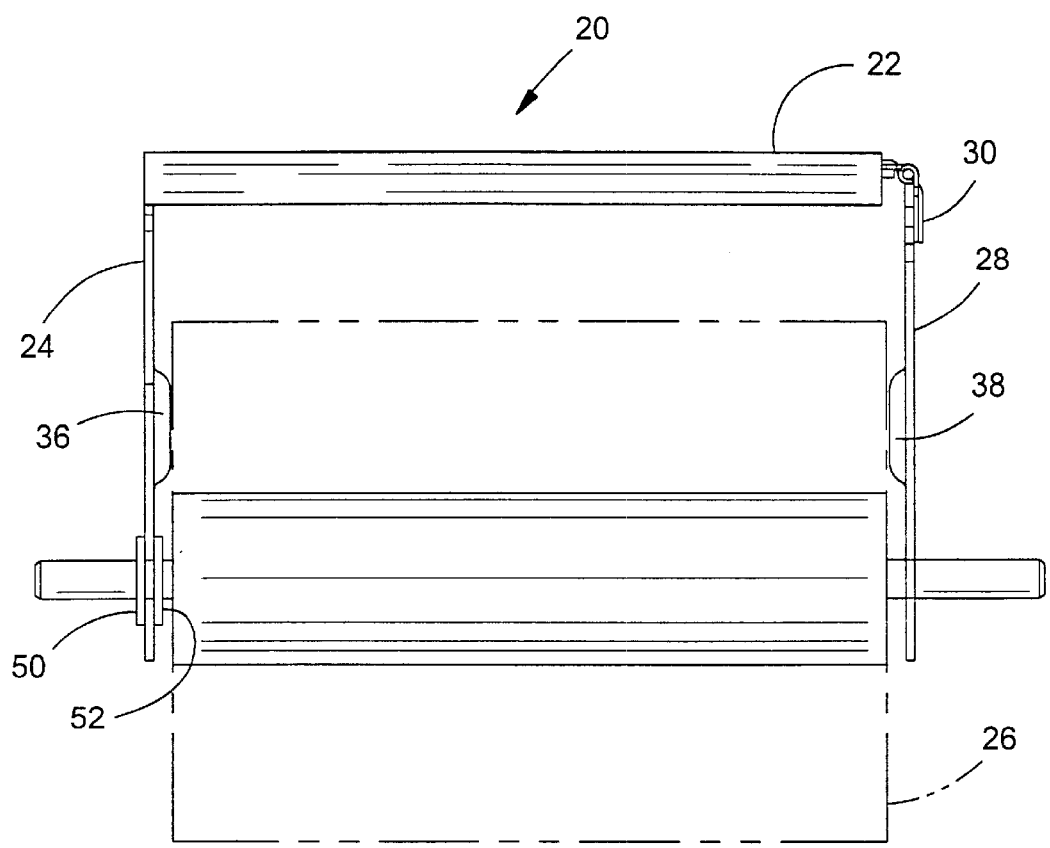
FIG. 5 is a top plan view of the preferred form of filter paper roll mounting apparatus.

Both the fixed arm 24 and hinged arm 28 have a spacing element 36 and 38, respectively, which are raised ridges embossed in the sheet metal arms that engage opposite sides of paper roll 26 to keep it centered between the arms and to tension the paper as it unwinds thus providing a uniform resistance which assists the filter paper tracking through the brewer assembly. Each arm 24 and 28 is also provided with an opening 40 and 42, respectively, in the form of a hole formed in the arms to support pins 44 and 46, respectively, which are secured to a support roll 48, shown in phantom. Pins 44 and 46 can be the opposite ends of a support rod, shown in phantom, or could be individual pins formed in or secured to the support roll 48. Openings 40 and 42 are only slightly larger in diameter than pins 44 and 46 to provide some clearance so the pins are free to rotate within the openings. Preferably, a pair of fasteners in the form of friction washers 50 and 52 (FIG. 5) hold the pin 44 in its location in opening 40 when hinged arm 28 is rotated to its position shown in FIG. 3 for removal of the spent paper roll 26 from support roll 48. This is done so that no parts are removed from the paper support apparatus which might be lost or misplaced during the paper roll changing process. When the hinged arm 28 is in this position the paper roll 26 can be removed from the support roll 48 so that these parts are left in position as shown in FIG. 4.

Referring again to the mounting bracket 22, as shown in FIG. 1, it preferably is provided with a curved upper edge 54 which provides a paper support and guide adjacent the brewing chamber to provide a smooth transition from the bracket to the brewing chamber for the paper being unwound from paper roll 26.

In view of the above, it will be seen that the several objects of the invention are achieved and other advantageous results attained.

As various changes could be made in the above constructions, without departing from the scope of the invention, it is intended that all matter contained in the above description and shown in the accompanying drawings shall be interpreted as illustrative and not in a limiting sense.

What is claimed is:

1. A filter paper roll mounting apparatus for use in a coffee vending machine, the coffee vending machine having a coffee brewer, the apparatus comprising:

a mounting bracket;

a first paper roll support arm rigidly fixed to and extending perpendicular from a first end of a mounting bracket and having an opening for receiving a first end of a support pin for a roll of paper; and a second paper roll support arm hinged to and extending from a second end of the mounting bracket spaced from the fixed arm and having an opening for receiving a second end of the support pin for the roll of paper so that roll of paper is supported for rotation between the fixed and hinged arms, the hinged arm being pivotable form a position for supporting the second end of the pin and a position which allows the pin and roll to be removed from or inserted into the apparatus; and the mounting bracket disposed adjacent to the coffee brewer, such that the roll of paper is may be fed into the coffee brewer.

2. The apparatus of claim 1, including:

a spring urging the hinged arm towards the fixed arm.

3. The apparatus of claim 1, including:

a fastener engaging the first end of the paper roll support pin securing the support pin to the fixed support arm so as to prevent removal of the pin from the fixed support arm.

4. The apparatus of claim 1, including:

the first and second arms each having a spacing and tensioning element engageable with opposite sides of the roll of paper mounted between the arms.

5. The apparatus of claim 1, including:

the mounting bracket having an upper curved paper guide portion disposed adjacent the coffee brewer for supporting the paper as it enters the brewer.

* * * * *